(12) United States Patent
Cafasso et al.

(10) Patent No.: US 11,010,473 B2
(45) Date of Patent: May 18, 2021

(54) METHOD OF DETECTING MALWARE IN A SANDBOX ENVIRONMENT

(71) Applicant: F-Secure Corporation, Helsinki (FI)

(72) Inventors: Matteo Cafasso, Helsinki (FI); Bruno Amaro Almeida, Helsinki (FI); Ville Lindfors, Vantaa (FI); Jorge Rodriguez Garcia, Malmo (SE)

(73) Assignee: F-Secure Corporation, Helsinki (FI)

( * ) Notice: Subject to any disclaimer, the term of this patent is extended or adjusted under 35 U.S.C. 154(b) by 115 days.

(21) Appl. No.: 16/220,063

(22) Filed: Dec. 14, 2018

(65) Prior Publication Data

US 2019/0188383 A1    Jun. 20, 2019

(30) Foreign Application Priority Data

Dec. 20, 2017   (GB) ..................................... 1721375

(51) Int. Cl.
     *G06F 21/56*      (2013.01)
     *G06F 21/55*      (2013.01)
     *G06F 21/53*      (2013.01)

(52) U.S. Cl.
     CPC ............ *G06F 21/566* (2013.01); *G06F 21/53* (2013.01); *G06F 21/554* (2013.01); *G06F 21/567* (2013.01); *G06F 21/568* (2013.01)

(58) Field of Classification Search
     CPC ...... G06F 21/566; G06F 21/53; G06F 21/554; G06F 21/567; G06F 21/568
     See application file for complete search history.

(56) References Cited

U.S. PATENT DOCUMENTS

| | | | | |
|---|---|---|---|---|
| 8,577,845 | B2 * | 11/2013 | Nguyen | G06F 11/1451 707/654 |
| 8,904,525 | B1 * | 12/2014 | Hodgman | G06F 21/567 726/22 |
| 9,223,966 | B1 | 12/2015 | Satish et al. | |
| 9,241,010 | B1 * | 1/2016 | Bennett | H04L 63/1433 |
| 9,565,202 | B1 * | 2/2017 | Kindlund | G06F 21/567 |
| 9,747,446 | B1 * | 8/2017 | Pidathala | G06F 21/56 |
| 9,792,141 | B1 * | 10/2017 | Sethuramalingam | G06F 8/63 |
| 2007/0271428 | A1 * | 11/2007 | Atluri | G06F 11/1451 711/162 |
| 2009/0031307 | A1 * | 1/2009 | Chodroff | G06F 11/3013 718/100 |
| 2009/0150518 | A1 * | 6/2009 | Lewin | H04L 67/2842 709/219 |
| 2009/0300076 | A1 * | 12/2009 | Friedman | G06F 11/3664 |
| 2011/0041179 | A1 * | 2/2011 | St Hlberg | G06F 21/566 726/23 |
| 2011/0314546 | A1 | 12/2011 | Aziz et al. | |

(Continued)

*Primary Examiner* — Sher A Khan
(74) *Attorney, Agent, or Firm* — Harrington & Smith

(57) ABSTRACT

There are provided measures for enabling detecting malware. A method includes generating a copy of a first node, configuring a sandbox environment by using the generated copy, executing an electronic file or a URL in the sandbox environment configured with the copy, providing a result of the malware analysis of the electronic file or the URL, identifying the electronic file or the URL as malicious or suspicious on the basis of the provided result, and taking further action for protecting the first node from the electronic file or the URL identified as malicious or suspicious.

18 Claims, 4 Drawing Sheets

(56) References Cited

U.S. PATENT DOCUMENTS

| | | | | |
|---|---|---|---|---|
| 2012/0151586 A1* | 6/2012 | Hentunen | ............ | G06F 21/563 726/24 |
| 2012/0291131 A1* | 11/2012 | Turkulainen | .......... | G06F 21/554 726/24 |
| 2013/0067577 A1* | 3/2013 | Turbin | .................... | G06F 21/56 726/24 |
| 2013/0081129 A1* | 3/2013 | Niemela | ............... | G06F 21/566 726/11 |
| 2013/0139264 A1* | 5/2013 | Brinkley | ............... | G06F 21/554 726/24 |
| 2014/0064104 A1* | 3/2014 | Nataraja | ............... | H04L 61/103 370/248 |
| 2014/0208425 A1* | 7/2014 | Palomaki | ............... | G06F 21/565 726/23 |
| 2014/0365822 A1* | 12/2014 | Tarves, Jr. | .......... | G06F 11/1484 714/15 |
| 2014/0372553 A1* | 12/2014 | Blackburn | .............. | H04L 67/34 709/217 |
| 2014/0379317 A1* | 12/2014 | Sanden | ................ | G01V 99/005 703/10 |
| 2015/0096024 A1* | 4/2015 | Haq | ...................... | G06F 21/552 726/23 |
| 2015/0220735 A1* | 8/2015 | Paithane | ................. | G06F 21/53 726/23 |
| 2017/0147819 A1 | 5/2017 | Vasilenko et al. | | |
| 2017/0243000 A1* | 8/2017 | Shraim | .................... | H04L 9/00 |
| 2018/0198821 A1* | 7/2018 | Gopalakrishna | .... | H04L 63/1416 |
| 2018/0285567 A1* | 10/2018 | Raman | ................... | G06F 21/53 |

* cited by examiner

METHOD OF DETECTING MALWARE IN A SANDBOX ENVIRONMENT

FIELD

The present invention relates to detecting malware in a sandbox environment. More specifically, the present invention relates to measures (including methods, apparatuses and computer program products) for enabling malware analysis in a specifically configured sandbox environment.

BACKGROUND

Nowadays, malware detection and scanning is a vital issue in any kind of networks, and is generally directed to identify (and potentially also disinfect) any kind of malware on computer and/or communication systems, such as e.g. viruses, Trojans, worms, or the like.

A sandbox is a secure environment where potentially harmful content (electronic files or uniform resource locators (URL)) can be executed/detonated in order to observe their behavior. The behavior is then used to draw conclusions about the safety of the content. For example, sandboxing can be run over an unknown email attachment to ensure that it is not exploiting any vulnerabilities leading to changes on the target computer or leaking sensitive information. A sandbox is typically composed by a hardware emulator or virtualization technology, one or more disk images reproducing the configuration of a real operating system and software installed and a set of forensic tools to observe the behavior of the sample under analysis. A sandbox may be implemented in several different ways, such as by process isolation, physical isolated real hardware, OS containerization, etc.

One of the main challenges when operating a sandbox is to get the samples under analysis to execute in the same manner as though they would execute on the target computer. Often the sample under test does not show its real behavior due to a misconfiguration of the execution environment. The execution environment may be different, may lack a given library/framework or hardware device or it may not look like the target environment. This adds cost to the sandbox operators which must continuously maintain and improve their collections of environments to keep up with modern software. The task is challenging as it is not possible to foresee the requirements of a sample in order to correctly execute it prior to the analysis. This issue is particularly relevant in relation to targeted attacks where the attackers are aware of the configuration of the target computer infrastructure. Thus, they often design exploits so that they will run only against the desired configuration.

Accordingly, it is desirable to enable a more reliable malware detection, i.e. to provide a realistic sandbox environment for malware analysis while at the same time reducing complexity of maintaining those from the sandbox operators.

SUMMARY

This section contains examples of possible implementations and is not meant to be limiting.

In an example aspect of the invention, there is a computer system, comprising one or more nodes, one or more memories configured to store computer program code, and one or more processors configured to read and execute computer program code stored in the memory, wherein the one or more processors are configured to cause the computer system to perform: generating, at a first node, a copy of the first node, wherein the copy comprises data storage content related to the operation and use of the first node and device configuration and hardware layout data of the first node; sending the generated copy of the first node from the first node to a second node for enabling the second node to configure a sandbox environment by using the generated copy; configuring, at the second node, a sandbox environment by using the generated copy of the first node; executing, at the second node, an electronic file or a URL in the sandbox environment configured with the copy of the first node; providing, from the second node to the first node, a result of the malware analysis of the electronic file or the URL on the basis of the execution in the configured sandbox environment; identifying the electronic file or the URL as malicious or suspicious on the basis of the provided result; and taking further action for protecting the first node from the electronic file or the URL identified as malicious or suspicious.

In another example aspect of the invention, there is a method comprising: generating, at first node, a copy of the first node, wherein the copy comprises data storage content related to the operation and use of the first node and device configuration and hardwood layout data of the first node; sending the generated copy of the first node from the first node to a second node for enabling the second node to configure a sandbox environment by using the generated copy; configuring, at the second node, a sandbox environment by using the generated copy of the first node; executing, at the second node, an electronic file or a URL in the sandbox environment configured with the copy of the first node; providing, from the second node to the first node, a result of the malware analysis of the electronic file or the URL on the basis of the execution in the configured sandbox environment; identifying the electronic file or the URL as malicious or suspicious on the basis of the provided result; and taking further action for protecting the first node from the electronic file or the URL identified as malicious or suspicious.

A further example embodiment is an embodiment is an apparatus and a method comprising the apparatus and the method of the previous paragraphs, wherein there is sending the electronic file or the URL to be analyzed for malware from the first node to the second node, wherein the second node executes the electronic file or the URL in the sandbox environment configured with the copy of the first node, wherein there is receiving, at the first node, the result of the malware analysis from the second node, wherein there is receiving, at a second node, the copy of the first node, wherein there is, at the second node, the electronic file or an URL to be analyzed for malware from the first node, wherein the configuring the sandbox environment further comprises modifying or encapsulating the file format of the copy of the first node for enabling integration of the copy with the sandbox environment, and/or wherein there is running a conversion script on the copy of the first node for enabling the copy to be reabable by sandboxing technologies used by the sandbox environment.

A non-transitory computer-readable medium storing program code, the program code executed by at least one processor to perform at least the operations as described in the paragraphs above.

A computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned example aspects of the present invention are set out herein with reference to the drawings and exemplifying embodiments of the present invention.

BRIEF DESCRIPTION OF THE DRAWINGS

In the following, the present invention will be described in greater detail by way of examples with reference to the accompanying drawings, in which.

DETAILED DESCRIPTION

Figure 1:
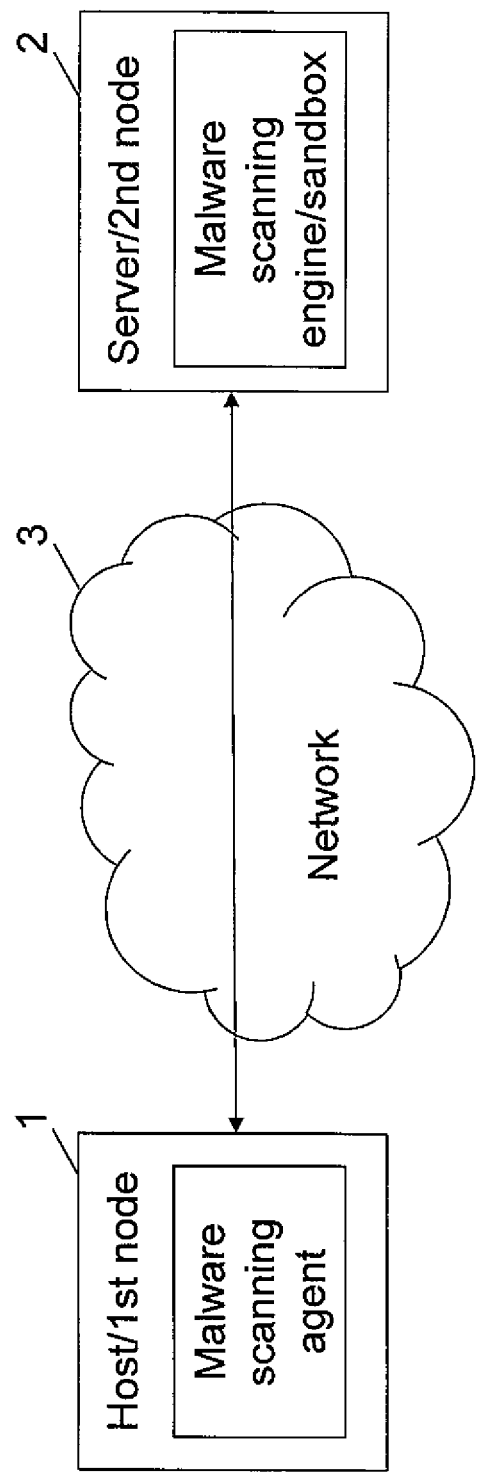
FIG. 1 shows a schematic diagram illustrating a computer system/computer network configuration, for which exemplifying embodiments of the present invention are applicable.

The present invention is described herein with reference to particular non-limiting examples and to what are presently considered to be conceivable embodiments of the present invention.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

FIG. 1 shows a schematic diagram illustrating a computer system configuration, for which exemplifying embodiments of the present invention are applicable.

As shown in FIG. 1, exemplifying embodiments of the present invention generally relate to a system configuration in which a local entity or host 1 and a remote entity or server 2 are connected via a network 3. Here, the host 1 exemplifies any computer or communication system (including a single device, a network node or a combination of devices), on which malware scanning is to be performed (remotely at/by the server). For example, the host 1 may include a personal computer, a personal communication device, a network-enabled device, a client, a firewall, a mail server, a proxy server, a database server, or the like. The server 2 exemplifies any computer or communication system (including a single device, a network node or a combination of devices), on which malware scanning is performed (of/for the host 1). For example, the server 2 may include a security entity or a backend entity of a security provider, or the like, and the server 2 may be realized in a cloud implementation or the like.

According to exemplifying embodiments of the present invention, remote malware scanning of/for the host 1 at/by the server 2 can be realized using a malware scanning agent (such as e.g. a (lightweight) anti-virus client or the like) being installed/arranged at the host 1 (like e.g. an anti-virus client function) and a malware analysis sandbox and/or a malware engine or application being installed/arranged at the server 2 (like e.g. an anti-virus server function).

The network 3 exemplifies any computer or communication network, including e.g. a (wired or wireless) local area network like LAN, WLAN, Ethernet, or the like, a (wired or wireless) wide area network like WiMAX, GSM, UMTS, LTE, or the like, and so on. Hence, the host 1 and the server 2 can but do not need to be located at different locations. For example, the network 3 may be any kind of TCP/IP-based network. Insofar, communication between the host 1 and the server 2 over the network 3 can be realized using for example any standard or proprietary protocol carried over TCP/IP, and in such protocol the malware scanning agent at the host 1 and the malware analysis sandbox or application at the server 2 can be represented on/as the application layer.

Figure 2:
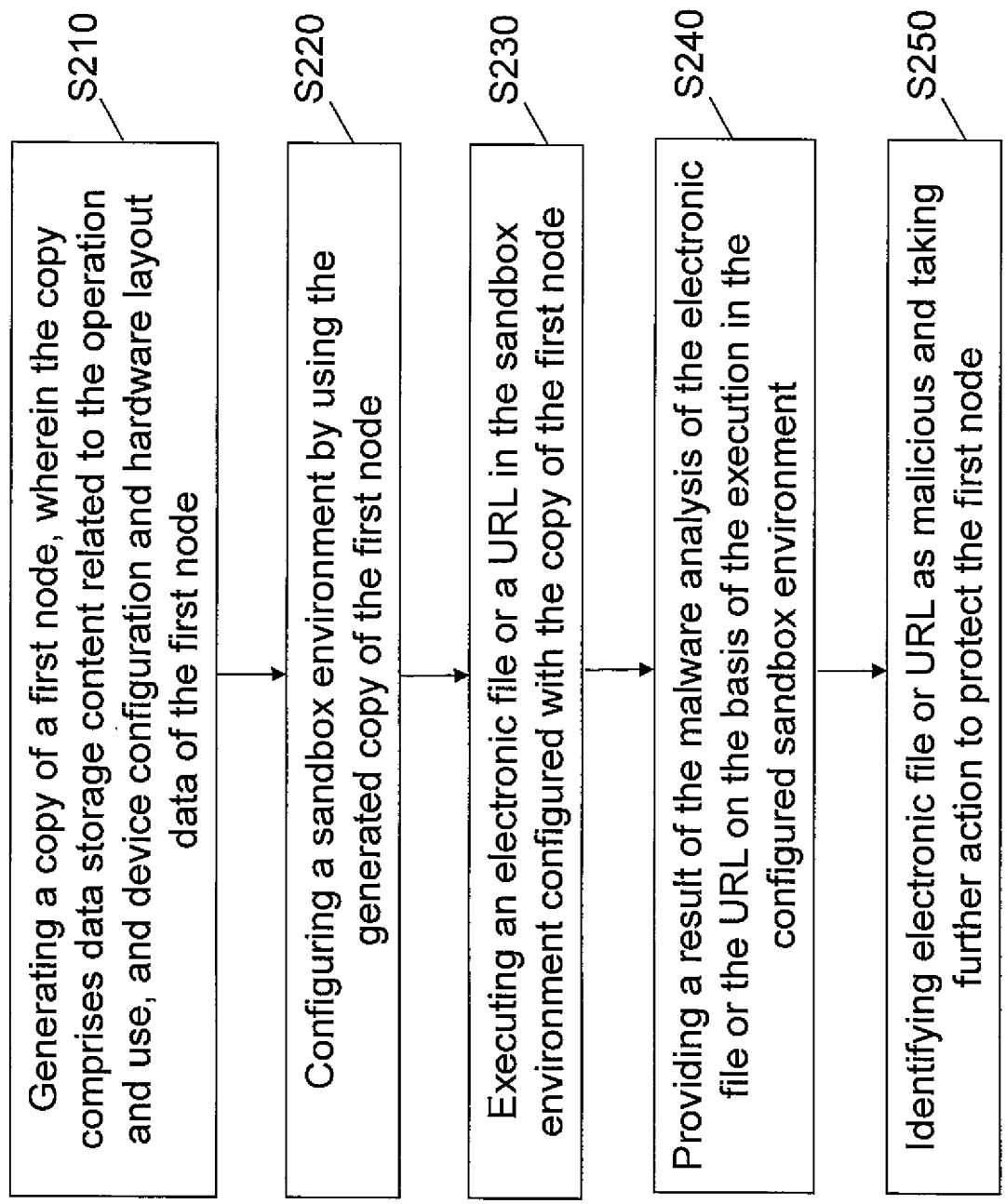
FIG. 2 shows a flowchart illustrating an example of a method, operable at a computer system, according to exemplifying embodiments of the present invention.

FIG. 2 shows a flowchart illustrating an example of a method according to exemplifying embodiments of the present invention. The illustrated method is for example operable at the first node or host and/or second node or server as illustrated in FIG. 1 (e.g. by or using the malware scanning agent/engine and sandbox environment thereof).

As shown in FIG. 2, a method according to exemplifying embodiments of the present invention, which is operable at a computer system comprising a first node such as a local entity or host and a second node such as a remote entity or server, and which could be referred to as method of malware detection and prevention, comprises an operation S210 of generating a copy of the first node. The copy of the first node comprises data storage content related to the operation and use of the first node and device configuration and hardware layout data of the first node. In S220 a sandbox environment is configured by using the generated copy of the first node.

In S230 an electronic file or a URL (Uniform Resource Locator) is executed in the sandbox environment configured with the copy of the first node. In S240, the result of the malware analysis of the electronic file or the URL on the basis of the execution in the configured sandbox environment is provided. In 250, the electronic file or the URL is identified as malicious or suspicious on the basis of the provided result, and further action is taken for protecting the first node from the electronic file or the URL identified as malicious or suspicious.

In an embodiment, the copy of the first node is generated at the first node and the generated copy is sent from the first node to a second node for enabling the second node to configure the sandbox environment by using the copy.

In an embodiment, the copy of the first node is received by the second node and the sandbox environment is configured by using the received copy at the second node.

In an embodiment, the electronic file or the URL is sent to be analyzed for maliciousness from the first node to the second node and the second node executes the electronic file or the URL in the sandbox environment configured with the copy of the first node.

In an embodiment, the step of configuring the sandbox environment further comprises modifying or encapsulating the file format of the copy of the first node for enabling integration of the copy with the sandbox environment. The method may also comprise running a conversion script on the copy of the first node for enabling the copy to be readable by virtualization technology used by the sandbox environment.

In an embodiment, the electronic file or an URL to be analyzed for malware is received at the second node from the first node and the electronic file or the URL is executed in the sandbox environment configured with the copy of the first node. The result of the malware analysis may be sent from the second node to the first node.

According to exemplifying embodiments of the present invention, the electronic file to be analyzed for malware can be any electronic file, particularly encompassing any electronic file including a runnable/executable part, such as any kind of application file. Insofar, exemplifying embodiments of the present invention are applicable to any such electronic file, including for example a file of an Android Application Package (APK), a Portable Executable (PE), a Microsoft Soft Installer (MSI) or any other format capable of distributing and/or installing application software or middleware on a computer.

Figure 3:
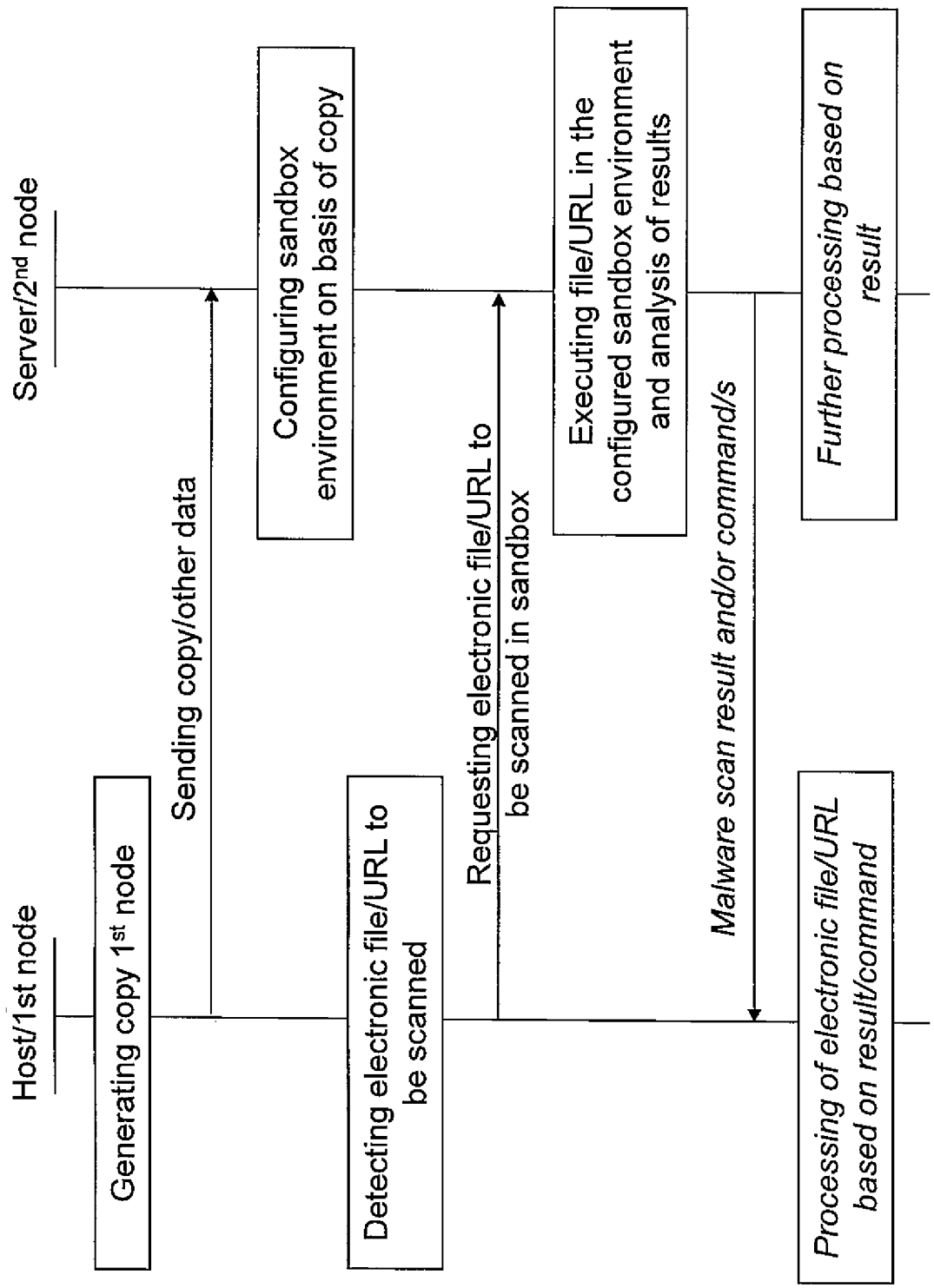
FIG. 3 shows a diagram illustrating an example of a procedure of malware detection and prevention according to exemplifying embodiments of the present invention.

FIG. 3 shows a diagram illustrating an example of a procedure of remote malware analysis according to exemplifying embodiments of the present invention. Basically, FIG. 3 illustrates the cooperation or interrelation between the operation of the first node and the operation of the second node.

A copy of the first node is generated at the first node. The copy may be a file copy, a device copy or a stream of data. The copy comprises data storage content related to the operation and use of the first node and device configuration and hardware layout data of the first node. In practice, the copy of a device (a PC, a tablet, a smartphone) may include the data storage content as well as it's configuration and hardware layout. In an embodiment, a virtual copy of the entire device (the data storage content, the type and amount of CPUs, the memory etc.) is made.

The generated copy is then sent to the second node where a sandbox environment is configured on the basis of the received copy.

When an electronic file/URL is detected to require scanning, the first node sends a request with the electronic file/URL to the second node to be executed in the configured sandbox environment. The file/URL is executed in the configured sandbox environment and the results are then analyzed and sent to the first node. The results may also include commands or alerts for managing the file/URL. Finally the first node takes further action and processes the electronic file/URL according to the received results/command. The second node may also further process the results, for example, by storing the results in a reputation database and/or alerting/informing other network nodes about the analyzed file/URL.

Before the start of the above-described procedure, the first node may perform a malware property query for the electronic file and the one or more file items contained in the electronic file and/or for an URL. Such malware property query may be a reputation query at a reputation database, such as the knowledge base of the second node. Then, the above-described procedure is initiated when the malware property query (reputation query) for at least one of the electronic files and/or URL yields a non-conclusive result. Otherwise, the above-described procedure can be skipped, and the conclusive result of the malware property query (reputation query) may be used as or for constructing a malware scanning result with respect to the electronic file, and processing of the electronic file may be based on such malware scanning result.

In the operation of performing the method, i.e. as a result of the malware detection, the second node may register (store) the result of the malware analysis of the electronic file and/or the URL.

At the end of the above-described procedure, the first node may obtain (receive) an overall malware analysis result of the electronic file/URL from the second node, and may process the electronic file/URL based on such overall result.

For example, the electronic file/URL, that is determined not to be safe, may be isolated, deleted or prevented from harming the host in any way.

An example usage flow may comprise the following steps: the hard-drive content of a disc of a user's laptop is copied, a conversion script is run on top of the copy (making it readable by sandboxing technologies) and the copy is uploaded to the server via a specific application programming interface (API). The server forwards the copy to a sandbox solution to be used as running environment. This requires no changes in the content of the copy, however, the file format may be changed or encapsulated in order to make it usable by the sandboxing technology used. The process does not need to affect the actual content of the copy but leaves the environment as it was once it was copied. The copy is deployed in the sandbox. The user may then give an instruction (via a specific API) to execute a file/URL in the sandbox using his/her laptop environment. The file/URL may then be executed as it would be on the actual user's environment/device.

In view of the above illustration of procedures, it is noted that any block may represent a single or multiple operations, and that any arrow may represent a single or multiple transmissions or operations. For example, although a single transmission of receipt and a single transmission of electronic file item/s is illustrated in FIG. 3, the receipt and the file item/s may also be transmitted in more than one transmission, respectively.

By virtue of exemplifying embodiments of the present invention, as described above, resource-efficient malware detection and prevention is enabled, which is capable of allowing the end customers to provide their own environments where to execute unknown software. In practice this means being able to accept a virtual copy of a company's device (PC, smartphone/tablet or laptop) and allow the user to scan unknown objects (files or URLs) using such copy.

This significantly reduces the maintenance cost for the sandbox operators and allows enhanced management of targeted attacks and advanced persistent threads.

Resource efficiency can be achieved in that the sandbox environment does not require any specific instrumentation/customization. Thus, the user/customer is able to upload his/her own environment as is. Thus, also a more reliable malware detection is enabled, i.e. a realistic sandbox environment for malware analysis can be provided while at the same time reducing complexity of maintaining those from the sandbox operators.

Accordingly, exemplifying embodiments of the present invention are able to reduce time, computational and/or storage requirements for malware analysis. The technical effects of exemplifying embodiments of the present invention are generally beneficial for malware management of any type of electronic file, especially any electronic file configured for or capable of distributing and/or installing application software or middleware on a computer.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Figure 4:
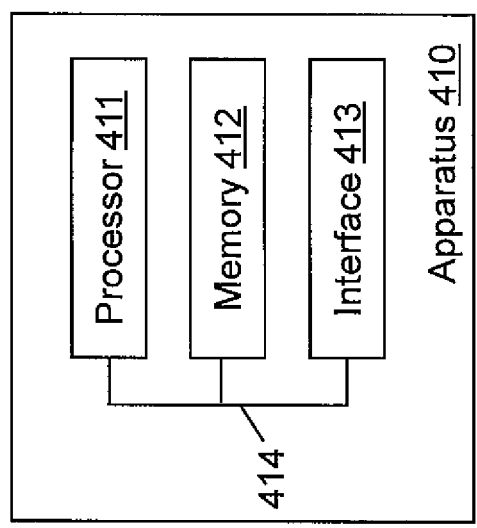
FIG. 4 shows a schematic diagram illustrating an example of a structure of an apparatus according to exemplifying embodiments of the present invention.

In the example of FIG. 4, the solid line blocks are basically configured to perform respective methods, procedures and/or functions as described above. The individual blocks are meant to illustrate respective functional blocks implementing a respective function, process or procedure, respectively. Such functional blocks are implementation-independent, i.e. may be implemented by means of any kind of hardware or software or combination thereof, respectively.

FIG. 4 shows a schematic diagram illustrating an example of a structure of an apparatus according to exemplifying embodiments of the present invention.

As indicated in FIG. 4, an apparatus 410 according to exemplifying embodiments of the present invention may comprise at least one processor 411 and at least one memory 412 (and possibly also at least one interface 413), which may be operationally connected or coupled, for example by a bus 414 or the like, respectively.

The processor 411 of the apparatus 410 is configured to read and execute computer program code stored in the memory 412. The processor may be represented by a CPU (Central Processing Unit), a MPU (Micro Processor Unit), etc., or a combination thereof. The memory 412 of the apparatus 410 is configured to store computer program code, such as respective programs, computer/processor-executable instructions, macros or applets, etc. or parts of them. Such computer program code, when executed by the processor 411, enables the apparatus 410 to operate in accordance with exemplifying embodiments of the present invention. The memory 412 may be represented by a RAM (Random Access Memory), a ROM (Read Only Memory), a hard disk, a secondary storage device, etc., or a combination of two or more of these. The interface 413 of the apparatus 410 is configured to interface with another apparatus and/or the user of the apparatus 410. That is, the interface 413 may represent a communication interface (including e.g. a modem, an antenna, a transmitter, a receiver, a transceiver, or the like) and/or a user interface (such as a display, touch screen, keyboard, mouse, signal light, loudspeaker, or the like).

The apparatus 410 may, for example, represent a (part of a) first node, such as local entity or host 1 in FIG. 1, or may represent a (part of a) second node, such as remote entity or server 2 in FIG. 1. The apparatus 410 may be configured to perform a procedure and/or exhibit a functionality as described in any one of FIGS. 2 to 3.

When representing a (part of a) first node, such as local entity or host 1 in FIG. 1, the apparatus 410 or its processor 411 (possibly together with computer program code stored in the memory 412), in its most basic form, is configured to generating a copy of a first node, wherein the copy comprises data storage content related to the operation and use of the first node and device configuration and hardware layout data of the first node; sending the generated copy of the first node to a second node acting as a server in a computer network for enabling the second node to configure a sandbox environment by using the copy; sending an electronic file or an URL to be analyzed for malware from the first node to the second node for enabling the second node to execute the electronic file or the URL in the sandbox environment configured with the copy of the first node; receiving the result of the malware analysis from the second node; and taking further action for protecting the first node from the electronic file or the URL identified as malicious or suspicious based on the received result.

When representing a (part of a) second node, such as remote entity or server 2 in FIG. 1, the apparatus 410 or its processor 411 (possibly together with computer program code stored in the memory 412), in its most basic form, is configured to receiving, from a first node, a copy of the first node, wherein the copy comprises data storage content related to the operation and use of the first node and device configuration and hardware layout data of the first node; configuring a sandbox environment by using the generated copy of the first node; receiving an electronic file or a URL to be analyzed for malware from the first node; executing the electronic file or the URL in the sandbox environment configured with the copy of the first node; providing a result of the malware analysis of the electronic file or the URL on the basis of the execution in the configured sandbox environment; identifying the electronic file or the URL as malicious or suspicious on the basis of the provided result; and taking further action for protecting the first node from the electronic file or the URL identified as malicious or suspicious.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 4 above, i.e. by one or more processors 411, one or more memories 412, one or more interfaces 413, or any combination thereof.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java®, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

The invention claimed is:

1. A method of detecting malware, the method comprising:
   generating, at a first node, a copy of the first node, wherein the copy comprises data storage content related to the operation and use of the first node and device configuration and hardware layout data of the first node;
   sending the generated copy of the first node from the first node to a second node for enabling the second node to configure a sandbox environment by using the generated copy;
   configuring, at the second node, a sandbox environment by using the generated copy of the first node;
   executing, at the second node, an electronic file or a URL in the sandbox environment configured with the copy of the first node;
   providing, from the second node to the first node, a result of the malware analysis of the electronic file or the URL on the basis of the execution in the configured sandbox environment; identifying the electronic file or the URL as malicious or suspicious on the basis of the provided result; and
   taking further action for protecting the first node from the electronic file or the URL identified as malicious or suspicious.

2. The method according to claim 1, further comprising sending the electronic file or the URL to be analyzed for malware from the first node to the second node, wherein the second node executes the electronic file or the URL in the sandbox environment configured with the copy of the first node.

3. The method according to claim 1, further comprising receiving, at the first node, the result of the malware analysis from the second node.

4. The method according to claim 1, further comprising: receiving, at a second node, the copy of the first node.

5. The method according to claim 1, further comprising receiving, at the second node, the electronic file or an URL to be analyzed for malware from the first node.

6. The method according to claim 1, wherein the configuring the sandbox environment further comprises modifying or encapsulating the file format of the copy of the first node for enabling integration of the copy with the sandbox environment.

7. The method according to claim 1, further comprising: running a conversion script on the copy of the first node for enabling the copy to be readable by sandboxing technologies used by the sandbox environment.

8. A computer system, comprising
   one or more nodes,
   one or more memories configured to store computer program code, and
   one or more processors configured to read and execute computer program code stored in the memory, wherein the one or more processors are configured to cause the computer system to perform:
   generating, at a first node, a copy of the first node, wherein the copy comprises data storage content related to the operation and use of the first node and device configuration and hardware layout data of the first node;
   sending the generated copy of the first node from the first node to a second node for enabling the second node to configure a sandbox environment by using the generated copy;
   configuring, at the second node, a sandbox environment by using the generated copy of the first node;
   executing, at the second node, an electronic file or a URL in the sandbox environment configured with the copy of the first node;
   providing, from the second node to the first node, a result of the malware analysis of the electronic file or the URL on the basis of the execution in the configured sandbox environment;
   identifying the electronic file or the URL as malicious or suspicious on the basis of the provided result; and
   taking further action for protecting the first node from the electronic file or the URL identified as malicious or suspicious.

9. The computer system according to claim 8, wherein the one or more processors are configured to cause the computer system to perform: sending the electronic file or the URL to be analyzed for malware from the first node to the second node, wherein the second node executes the electronic file or the URL in the sandbox environment configured with the copy of the first node.

10. The computer system according to claim 8, wherein the one or more processors are configured to cause the computer system to perform: receiving, at the first node, the result of the malware analysis from the second node.

11. The computer system according to claim 8, wherein the one or more processors are configured to cause the computer system to perform: receiving, at a second node, the copy of the first node.

12. The computer system according to claim 8, wherein the one or more processors are configured to cause the computer system to perform: receiving, at the second node, the electronic file or an URL to be analyzed for malware from the first node.

13. The computer system according to claim 8, wherein the processor is configured to cause the computer system to perform: modifying or encapsulating the file format of the copy of the first node for enabling integration of the copy with the sandbox environment when configuring the sandbox environment.

14. A method of detecting malware, the method comprising at a first node:
generating, at the first node, a copy of the first node, wherein the copy comprises data storage content related to the operation and use of the first node and device configuration and hardware layout data of the first node;
sending the generated copy of the first node to a second node acting as a server in a computer network for enabling the second node to configure a sandbox environment by using the generated copy;
sending an electronic file or an URL to be analyzed for malware from the first node to the second node for enabling the second node to execute the electronic file or the URL in the sandbox environment configured with the copy of the first node;
receiving from the second node the result of the malware analysis; and
taking further action for protecting the first node from the electronic file or the URL identified as malicious or suspicious based on the received result.

15. A method of detecting malware, the method comprising at a second node acting as a server in a computer network:
receiving at the second node, from a first node, a copy of the first node, wherein the copy comprises data storage content related to the operation and use of the first node and device configuration and hardware layout data of the first node;
configuring, at the second node, a sandbox environment by using the generated copy of the first node;
receiving an electronic file or a URL to be analyzed for malware from the first node;
executing, at the second node, the electronic file or the URL in the sandbox environment configured with the copy of the first node;
providing, from the second node to the first node, a result of the malware analysis of the electronic file or the URL on the basis of the execution in the configured sandbox environment;
identifying the electronic file or the URL as malicious or suspicious on the basis of the provided result; and
taking further action for protecting the first node from the electronic file or the URL identified as malicious or suspicious.

16. The method according to claim 15, further comprising sending the result of the malware analysis to the first node.

17. The method according to claim 15, wherein the configuring the sandbox environment further comprises modifying or encapsulating the file format of the copy of the first node for enabling integration of the copy with the sandbox environment.

18. The method according to claim 15, further comprising:
running a conversion script on the copy of the first node for enabling the copy to be readable by sandboxing technologies used by the sandbox environment.

* * * * *